(12) United States Patent
Dejordy

(10) Patent No.: US 12,407,132 B2
(45) Date of Patent: Sep. 2, 2025

(54) PLUG PROTECTING DEVICE

(71) Applicant: John Dejordy, Morrisonville, NY (US)

(72) Inventor: John Dejordy, Morrisonville, NY (US)

(73) Assignee: John Dejordy, Morrisonville, NY (US)

( * ) Notice: Subject to any disclaimer, the term of this patent is extended or adjusted under 35 U.S.C. 154(b) by 368 days.

(21) Appl. No.: 17/932,017

(22) Filed: Sep. 14, 2022

(65) Prior Publication Data
US 2023/0083974 A1 Mar. 16, 2023

Related U.S. Application Data

(60) Provisional application No. 63/244,797, filed on Sep. 16, 2021.

(51) Int. Cl.
H01R 13/60 (2006.01)
B60D 1/64 (2006.01)
H04M 1/11 (2006.01)

(52) U.S. Cl.
CPC ............ *H01R 13/60* (2013.01); *B60D 1/64* (2013.01); *H01R 2201/26* (2013.01); *H04M 1/11* (2013.01)

(58) Field of Classification Search
CPC ....... H01R 13/60; H01R 2201/26; B60D 1/64
USPC ........................................ 439/131
See application file for complete search history.

(56) References Cited

U.S. PATENT DOCUMENTS

| | | | | |
|---|---|---|---|---|
| 2,082,986 A * | 6/1937 | Staley | ........... | H01R 13/4538 439/140 |
| 4,707,043 A * | 11/1987 | Reed | ........... | H01R 13/443 439/282 |
| 5,722,854 A * | 3/1998 | Geisler | ........... | H01R 13/443 439/528 |
| 5,800,188 A * | 9/1998 | Barber | ........... | B60D 1/64 439/651 |
| 6,447,302 B1 * | 9/2002 | Davis | ........... | H01R 29/00 439/35 |
| 6,705,880 B2 * | 3/2004 | Rhude | ........... | H01R 13/60 439/142 |
| 8,535,071 B1 * | 9/2013 | Mueller | ........... | H01R 13/6315 439/923 |
| 9,543,701 B2 * | 1/2017 | Garske | ........... | H01R 13/639 |
| 2003/0186564 A1 * | 10/2003 | Rhude | ........... | H01R 13/60 439/35 |

(Continued)

FOREIGN PATENT DOCUMENTS

| | | | |
|---|---|---|---|
| CN | 210517155 U | * | 5/2020 |
| CN | 212751208 U | * | 3/2021 |

(Continued)

*Primary Examiner* — Peter G Leigh

(74) *Attorney, Agent, or Firm* — Woods Oviatt Gilman LLP; Dennis B. Danella, Esq.

(57) ABSTRACT

A plug protecting device is provided, including a housing and a non-conductive terminal protective port that corresponds to a male charging or connecting plug of an electronic device which provides a secure fit that protects the plug when not in use. An attachable vehicle to trailer plug protection device is also provided, including a housing and a terminal protective port that corresponds to a male plug of a trailer which provides a secure fit that protects the plug when not in use. Also provided are an integrated plug protecting device and an integrated trailer to vehicle plug protection device including respective terminal protective ports.

18 Claims, 8 Drawing Sheets

(56) References Cited

U.S. PATENT DOCUMENTS

2010/0144197 A1\* 6/2010 Rotenberg ........... H01R 13/516
439/573

FOREIGN PATENT DOCUMENTS

DE 3327087 C \* 8/1984 ......... H01R 13/6397
FR 2972081 A1 \* 8/2012 .......... B60L 11/1818

\* cited by examiner

PLUG PROTECTING DEVICE

CROSS-REFERENCE TO RELATED APPLICATIONS

This application claims the benefit of U.S. Patent Application No. 63/244,797, filed on Sep. 16, 2021, the contents of which are incorporated by reference in their entirety.

FIELD OF THE INVENTION

The present disclosure generally relates to a plug protecting device, and more specifically, to a plug protecting device including a terminal protective port.

BACKGROUND OF THE INVENTION

When not in use, charger cables, power cables, communications cables, or other similar connection cables are most often left hanging or on the ground where the cable plug (the metal male end) can be exposed to air, moisture, and/or dust particles that may shorten its lifespan by reducing or degrading the electrical conductivity of the plug. Also, wires hanging down or laying on the ground may be stepped on or tripped over, leading to damage to the cable and/or the corresponding electronic device, and/or causing harm to the user.

There exists cable holders or clips that try to address some of these issues. However, while they can retain the cables themselves or the cable heads/ends, these products leave the electrically conductive plug itself (metal male end) exposed and unprotected.

Similarly, trailer to vehicle plugs are often left exposed when the trailer is disconnected from its towing vehicle. Although many trailers come equipped with holders for these plugs, these holders lack a protective element that protects the plug from physical damage as well as exposure to salt, ice, air, humidity, and dust or dirt particles which can result in oxidation and subsequent damage to the pins of the connector.

Therefore, there is a need for a plug protecting device that can surround and protect the electrically conductive male plug of a charger or other connection cable while not in use. Likewise, there is also a need for a trailer plug protection device as well as other needs.

SUMMARY OF THE INVENTION

According to one aspect, a plug protecting device including a terminal protective port is provided. The terminal protective port is designed to surround and protect a plug (an electrically conductive male end) of a charging cable, a power cable, a communications cable, or other similar connection cable commonly used with modern electronic devices, while such cable is not in use for charging/powering or otherwise connecting an electronic device.

The terminal protective port has the same design (size and shape) as a female port into which the metal male end of the corresponding cable would be inserted during ordinary use for charging, powering, communicating, or otherwise connecting various electronic devices.

However, the terminal protective port of the plug protecting device does not function as a connection for electrical conduction. Rather, its purpose is simply to receive and secure the metal male end of the cable when not in use (in order to protect the plug itself when not connected to an electronic device for its ordinary purpose).

The plug protecting devices described herein addresses the issue of loose cables by a distinctly different means than the cable clips or holders, and more importantly, also receives and secures the metal male end of the cable and thereby protects the plug from contaminants that may be present in the surrounding environment of the plug.

According to another aspect, a trailer plug protecting device including a terminal protective port is also provided, with similar advantages.

Also provided is an integrated plug protecting device and an integrated trailer to vehicle plug protection device including respective terminal protective ports.

Additional aspects, advantages and novel features of the present invention will be set forth in part in the description which follows, and will in part become apparent to those in the practice of the invention, when considered with the attached figures.

BRIEF DESCRIPTION OF THE DRAWINGS

The accompanying drawings form a part of this specification and are to be read in conjunction therewith, wherein like reference numerals are employed to indicate like parts in the various views, and wherein.

DETAILED DESCRIPTION OF THE INVENTION

Figure 1:
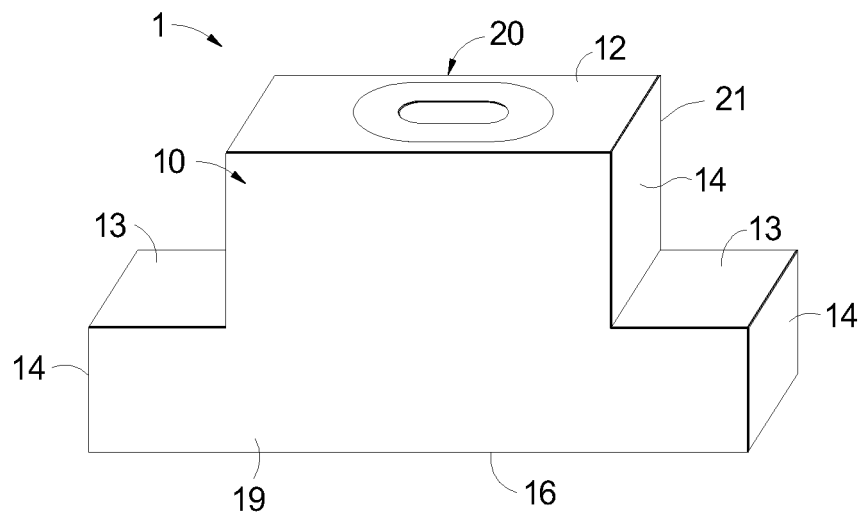
FIG. 1 is a perspective view of a plug protecting device with a terminal protective port, according to an exemplary aspect of the invention.

Turning now to the drawings, with reference to FIG. 1, one exemplary embodiment of a plug protecting device is identified with reference numeral 1. Plug protecting device 1 includes a body or housing 10 and a terminal protective port 20, which is associated with and surrounded by the housing 10. Terminal protective port 20 is non-electrically-conducting as described further below with reference to FIG. 2.

Housing 10 includes a plurality of outer surfaces, including for example, a raised top face 12, and one or more recessed faces 13 disposed on opposite sides of top face 12. Housing 10 further includes a plurality of side faces 14, a bottom face 16, and opposing front and rear faces 19, 21. Top face 12 of the housing 10 provides a surface for receiving of a male plug of a charging cable or connection cable via terminal protective port 20. Bottom face 16 of housing 10 provides a surface for selectively securing or attaching plug protecting device 1 to a desired mounting surface.

Terminal protective port 20 is configured to receive, surround and protect the male plug of a charging cable or connection cable when not in use for charging or connecting of an electronic device. It should be understood that the shape, size, and configuration of the housing 10 shown in FIG. 1 is provided as an example and is not intended to be limiting, and can vary widely in other example embodiments.

Figure 2:
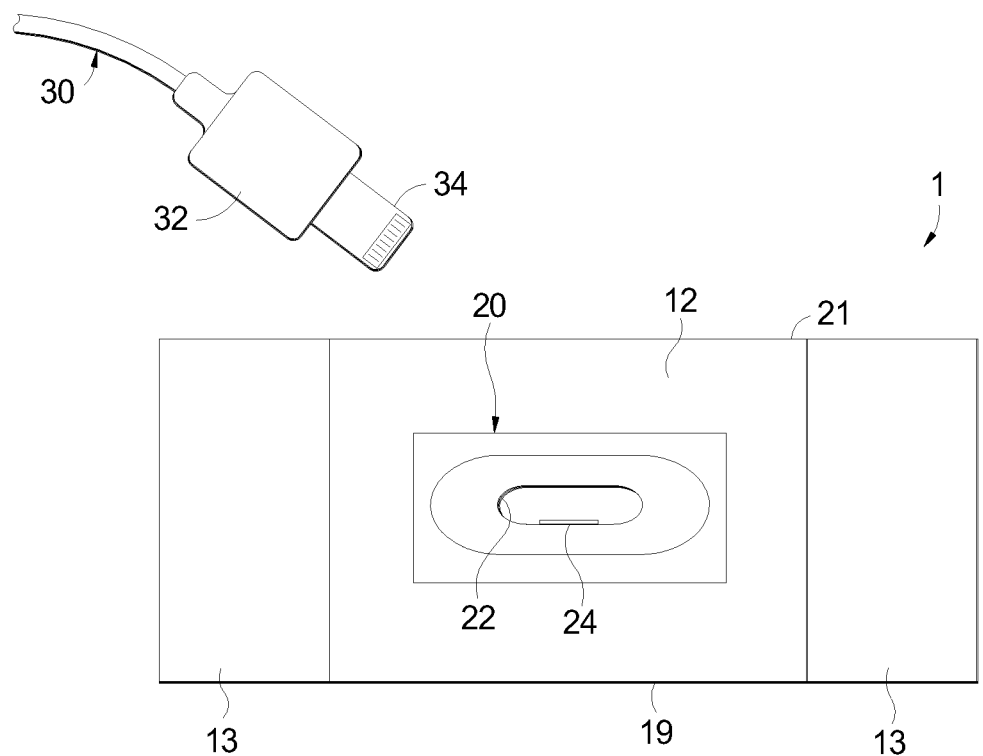
FIG. 2 is a top view of the plug protecting device shown in FIG. 1 with the terminal protective port and an associated plug.

With further reference to FIG. 2, a top view of plug protecting device 1 with terminal protective port 20, according to an exemplary embodiment is provided. Plug protective device 1 is adapted to be used in conjunction with a typical charging cable 30 or similar connecting cable commonly used with an electronic device (not shown). Terminal protective port 20 includes an opening 22 defined in top face 12 that is configured to receive a metal male end 34 (the conducting device charging or connecting contact) of charging or connecting cable 30 that is inserted by a user via a head end 32. Opening 22 of terminal protective port 20 may include one or more contacts 24 corresponding to contacts of metal male end 34. However, corresponding contacts 24 are not required, and opening 22 of the terminal protective port 20 could also include no metal contacts in other exemplary embodiments.

Terminal protective port 20 is designed to match the dimensions of a female port that corresponds to the plug of a specific charger or connector cable that used in conjunction with the present invention. It should be understood that the dimensions of terminal protective port 20 should be confining enough to maintain contact between the surfaces of metal male end 34 of the charging/connecting cable 30 and opening 22 and/or contacts 24 of the terminal protective port 20) to prevent the male plug 34 from falling out, while also being unrestrictive enough to allow the user to effortlessly insert and remove male plug 34 into and out of terminal protective port 20.

The location of terminal protective port 20 may be on the top face 12, as shown in FIGS. 1-2, or on any other side surface 14, 19, 21, other than bottom face 16, which is used for attachment of housing 10 of the plug protecting device to a suitable mounting surface. Terminal protective port 20 could be located in other locations for different sizes and shapes of housings.

Terminal protective port 20 may be made of frictional plastic, silicone, metal, or any other suitable materials. Further, terminal protective port 20 could be made of a material that is the same as or different than a material of housing 10. Terminal protective port 20 may be secured to or inside the protective housing 10 via adhesive or glue, although such attachment is not limited to these means or materials.

However, it is important to note that terminal protective port 20 of plug protecting device 1 does not actually function as a connection for electrical conduction (i.e., non-conductive). Rather, its purpose is simply to physically receive and secure metal male end 34 of cable 30 when not in use in order to protect metal male end 34 itself when not connected to an electronic device for its ordinary purpose. For example, terminal protective port 20 may be very similar to an existing female port of a smartphone or other electronic device, except that the female port is not electrically connected to anything (e.g., no wires or circuits are connected to the terminal protective port, and no power or signals are being communicated). In this regard, terminal protective port 20 may be considered a non-electrically-functioning dummy port (other than its sole function of physically protecting the male plug). Thus, even in example embodiments where terminal protective port 20 has the same metal contacts as the receptacle of the electronic device to be charged or otherwise connected, terminal protective port 20 is a "dead end" receptacle with respect to conduction/or and electrical signals.

FIG. 2 shows a Lightning type of plug (iPhone or other Apple device charging cable or connection cable), for example. However, example embodiments are not limited thereto, and the terminal protective port may also be designed to correspond to various other different types of metal male ends (e.g., USB Type C, Micro-USB, USB, etc.) for use with Android devices and various other types of compatible electronic devices with similar types of charging/communication ports.

Further, although FIGS. 1-2 show a single terminal protective port 20, the number of protective ports could vary from one port to multiple ports. Another plug protecting device according to a modification of the first exemplary embodiment could include a plurality terminal protective ports 20 (e.g., 2-3 or more), of either identical types or different types, in whatever combination makes sense depending on the user's needs and number and/or types of electronic devices.

The plug protecting device 1 described herein addresses the issue of loose cables by a distinctly different means than the cable clips or holders, and more importantly, also receives and secures the metal male end of the cable and thereby protects the plug from contaminants that may be present in the surrounding environment.

Figure 3:
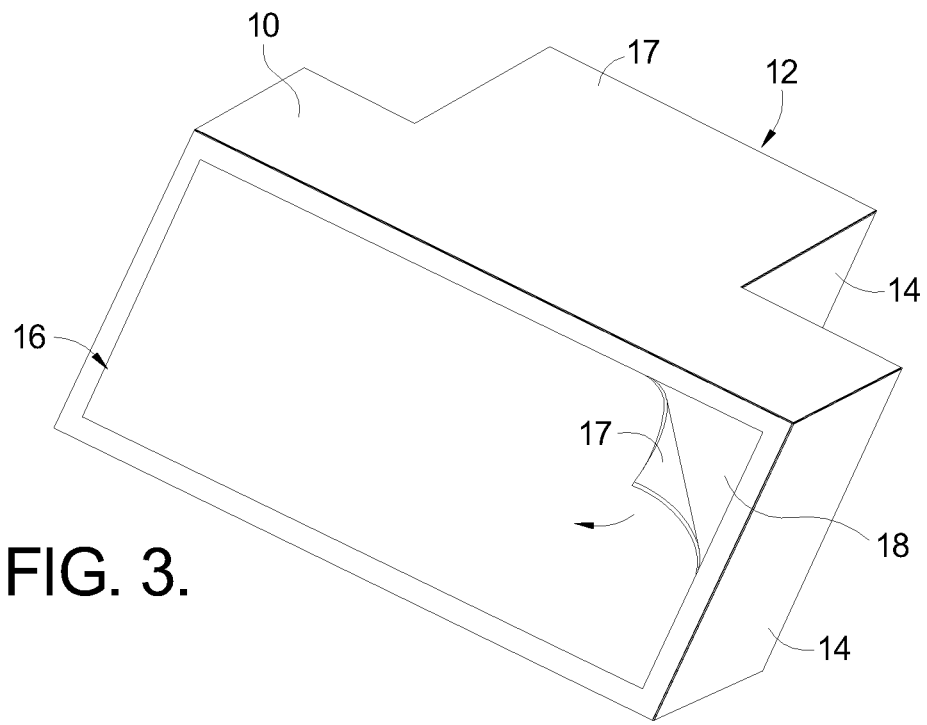
FIG. 3 is a bottom perspective view of the plug protecting device shown in FIG. 1 including an adhesive layer for attaching the housing of the plug protecting device to various surfaces.
Figure 4:
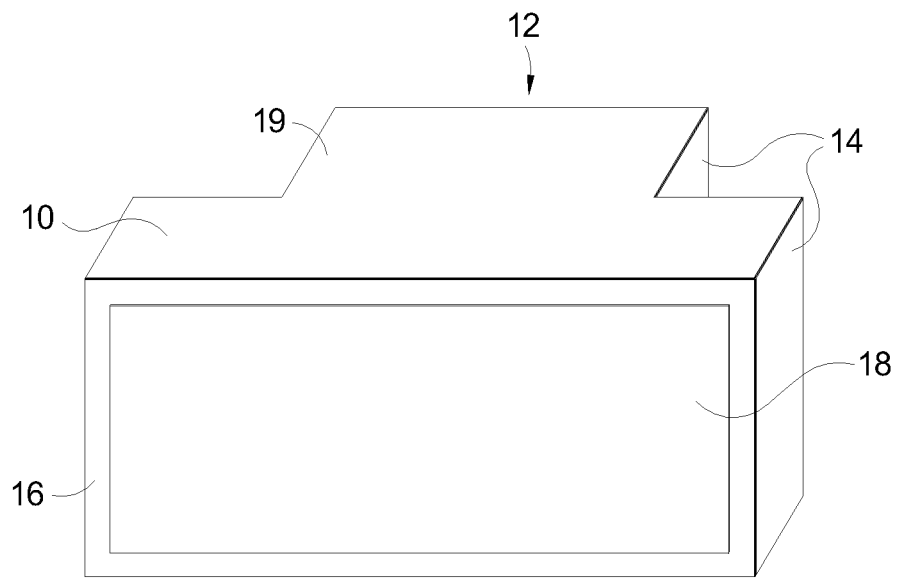
FIG. 4 is a bottom perspective view of the plug protecting device shown in FIG. 1 including the adhesive layer.

FIGS. 3 and 4 show a perspective view of a bottom face 16 of plug protecting device 1 including an adhesive layer 18 for attaching the housing of the plug protecting device to various mounting surfaces, according to an exemplary embodiment. At the time of initial installation, adhesive layer 18 may be covered with a thin sheet 17, which is to be removed (e.g., peeled off by the user) when ready to attach plug protecting device 1 to a suitable mounting surface. Thus, adhesive layer 18 can be used to temporarily or permanently mount plug protecting device 1 to a surface in a desired mounting location where the charging or connecting cable 30 will be used.

Although FIGS. 3-4 show adhesive layer 18 in a rectangular shape, other sizes and shapes are within the scope of the present invention. Alternatively, plug protecting device 1 may be affixed via glue, a screw, or some other attachment means, which would enable housing 10 to be attached to a suitable surface (e.g., a piece of furniture such as a nightstand, bed frame, or desk; a wall or power outlet or power strip; a vehicle dashboard or console, a device holder such as a phone cradle, etc.), as desired by the user.

One exemplary non-limiting use case for plug protecting device 1 is at a bedside table, when the charger for an electronic device is not in use. The user will have already attached plug protecting device 1 to a mounting surface near the charging cable 30 connected to a wall outlet or USB outlet. When the user unplugs the charging cable 30 from his or her electronic device, the user proceeds to insert the male plug 34 into opening 22 of terminal protective port 20. This allows the user to easily protect the male plug 34 while leaving it in an easily retrievable location. Securing the male plug 34 in this way also results in keeping the charger cable ends off the ground by a means distinct from any cable organizers or clips.

Further, inventive concepts described herein are not limited to the independent plug protecting device described above with reference to FIGS. 1-4. Similarly, terminal protective port 20 could also be incorporated into any of the suitable surfaces or products mentioned above, or any other convenient location at the time of manufacturing such products. For example, terminal protective port 20 can also be integrated directly into another apparatus such as a device holder (e.g., a phone cradle).

Figure 5:
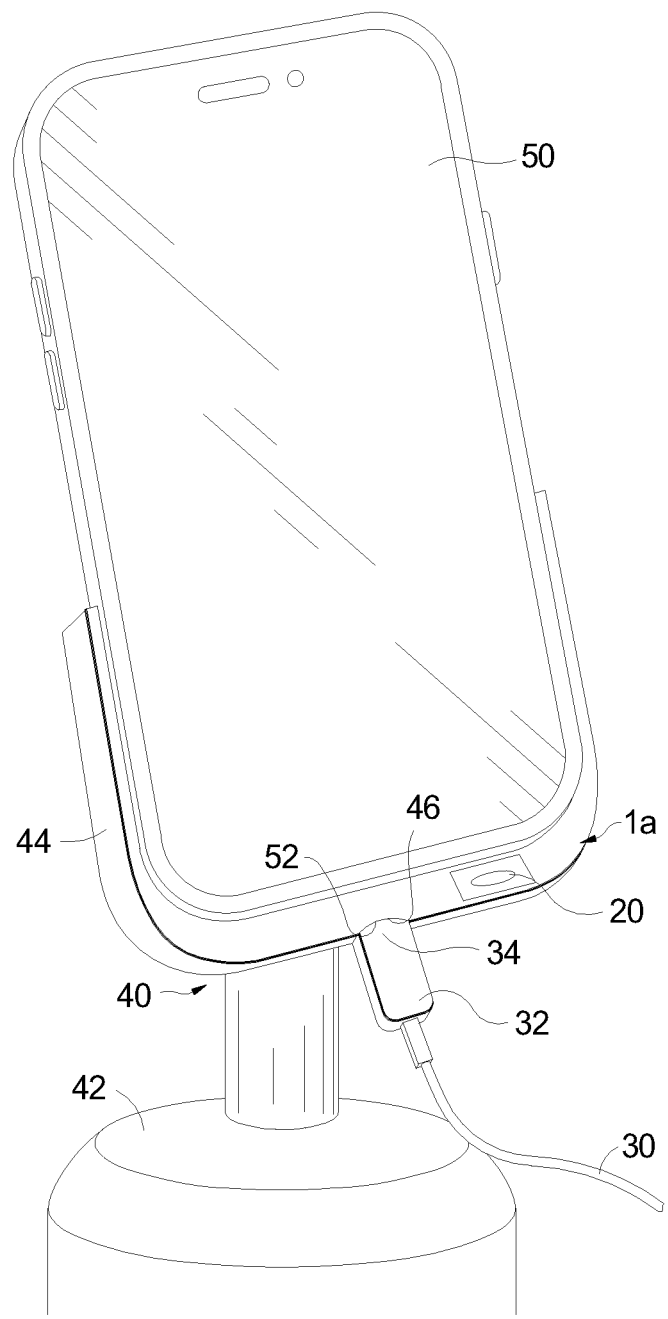
FIG. 5 is an alternative example of a plug protecting device with the terminal protective port defined in a portion of a phone holder.

FIG. 5 shows an alternative example of a plug protecting device 1a with the terminal protective port integrated into a phone holder, according to another exemplary embodiment. For example, a device holder 40 (e.g., a phone cradle) may include a base 42, a cradle 44 for receiving and supporting a device 50 (e.g., a smart phone), and an opening 46 defining a charging port 52 of device 50. Device holder 40 includes terminal protecting port 20, which may be integrated into cradle 44 adjacent the opening 46, for example. However, other configurations and locations are also possible, and example embodiments are not limited thereto.

Thus, when the user unplugs cable 30 and removes device 50 from cradle 44, the user can then insert metal male end 34 of cable 30 into terminal protective port 20 that is integrated in cradle 44 of device holder 40, and thereby protect plug of the charging cable 30 when not connected to device 50.

Although FIG. 5 shows terminal protective port 20 integrated into a device holder such as phone cradle 44, other embodiments are also within the scope of the invention. Similar to the phone holder embodiment, terminal protective port 20 may also be integrated into a vehicle dashboard or console, a wall, a power outlet, a power strip, a piece of furniture (e.g., desk, bed frame, nightstand, etc.), or mounted in or on some other suitable surface where charging, communications, or other connection cables might be used.

In another non-limiting exemplary embodiment, the plug protecting device could be integrated within a dashboard of an automobile or other vehicle. When the charger or connection cable 30 is not connected to a smart phone or other electronic device, the male plug 34 is inserted into terminal protective port 20 of the plug protecting device. This securely holds the male plug 34 in place and surrounds male plug 34, preventing it from falling to the floor of the vehicle where it is subjected to contamination or physical damage.

Additionally, inventive concepts described herein are not limited to charging cables for cell phones or other electronic devices. Similarly, a plug protecting device 1b with a terminal protective port can also be utilized in the context of trailer plugs, as described further below with reference to FIGS. 6-10.

Figure 6:
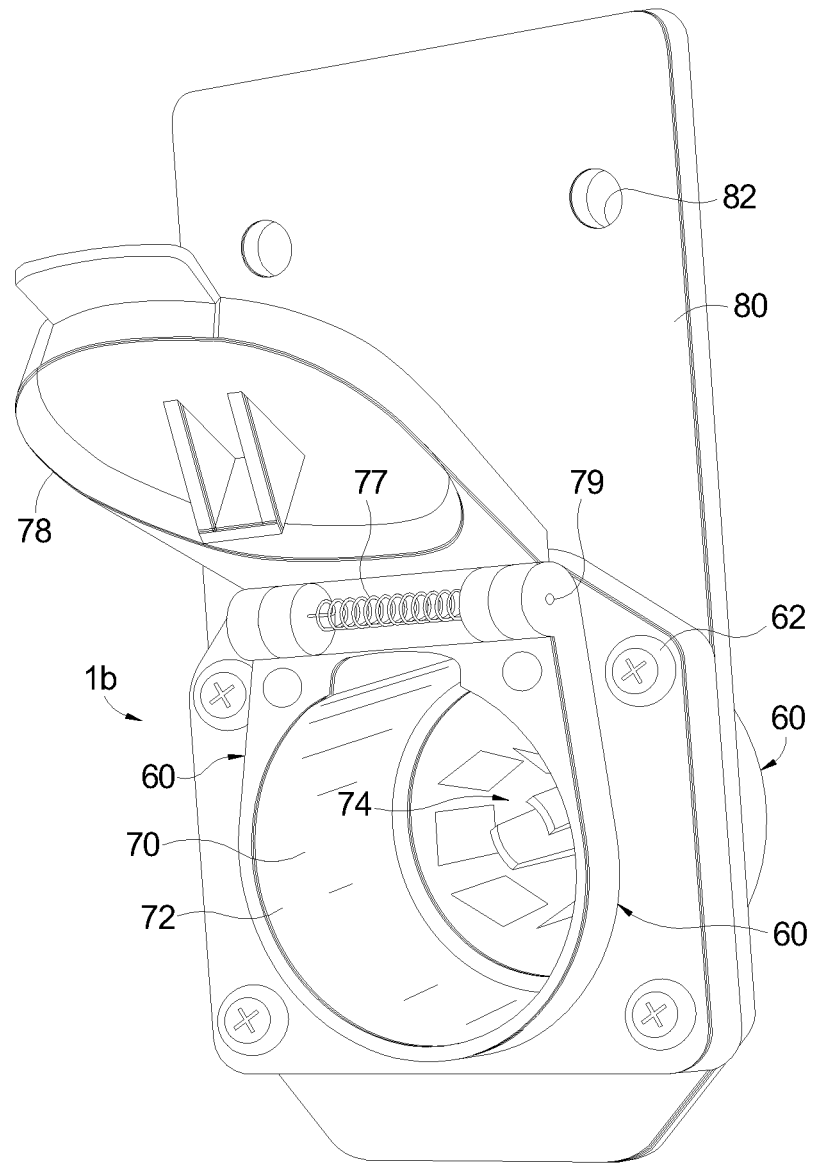
FIG. 6 is a front perspective view of a trailer plug protection device including a cover in an open position.
Figure 8:
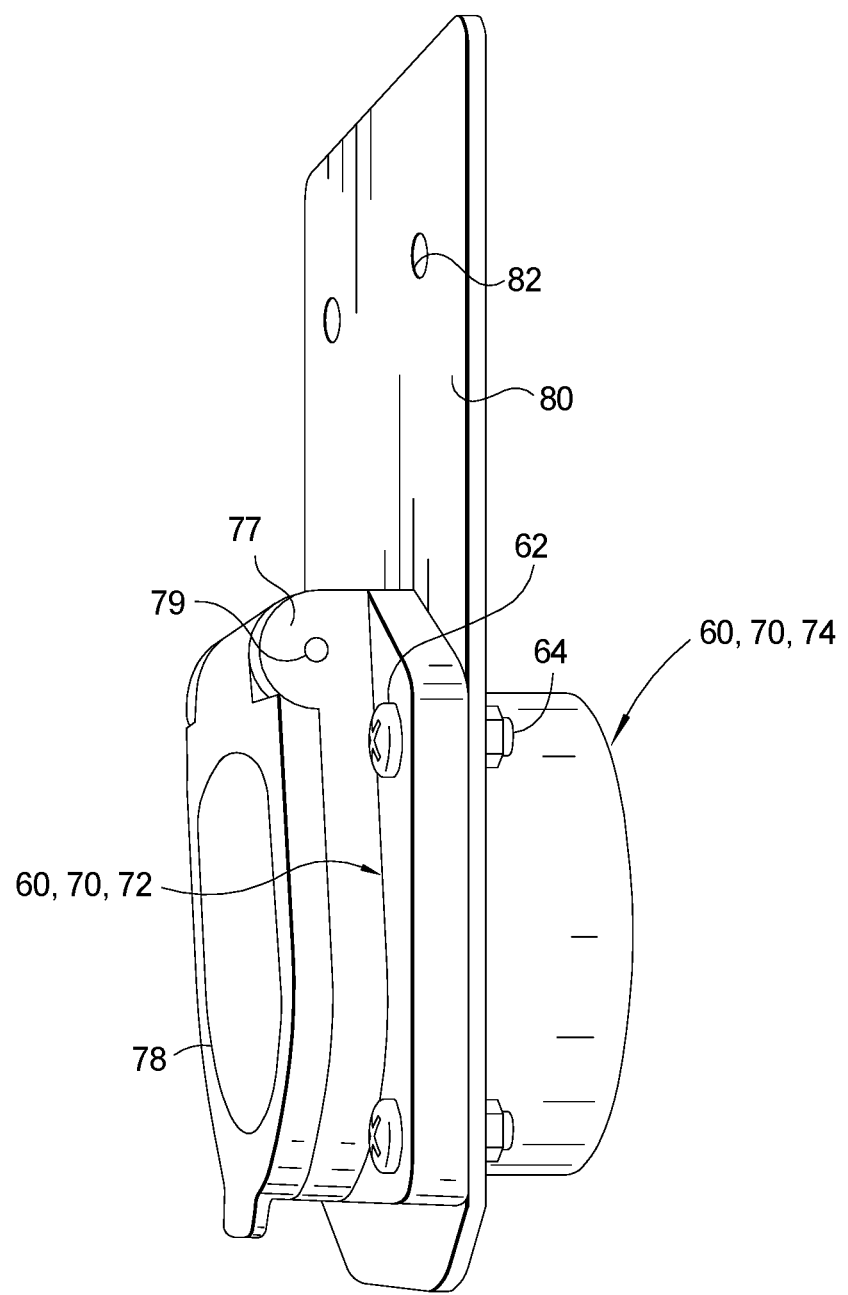
FIG. 8 is a right side view of the trailer plug protection device shown in FIG. 7 with the cover in the closed position.
Figure 9:
FIG. 9 is a perspective view of a trailer plug for use with the trailer plug protection device shown in FIGS. 6-8.
Figure 10:
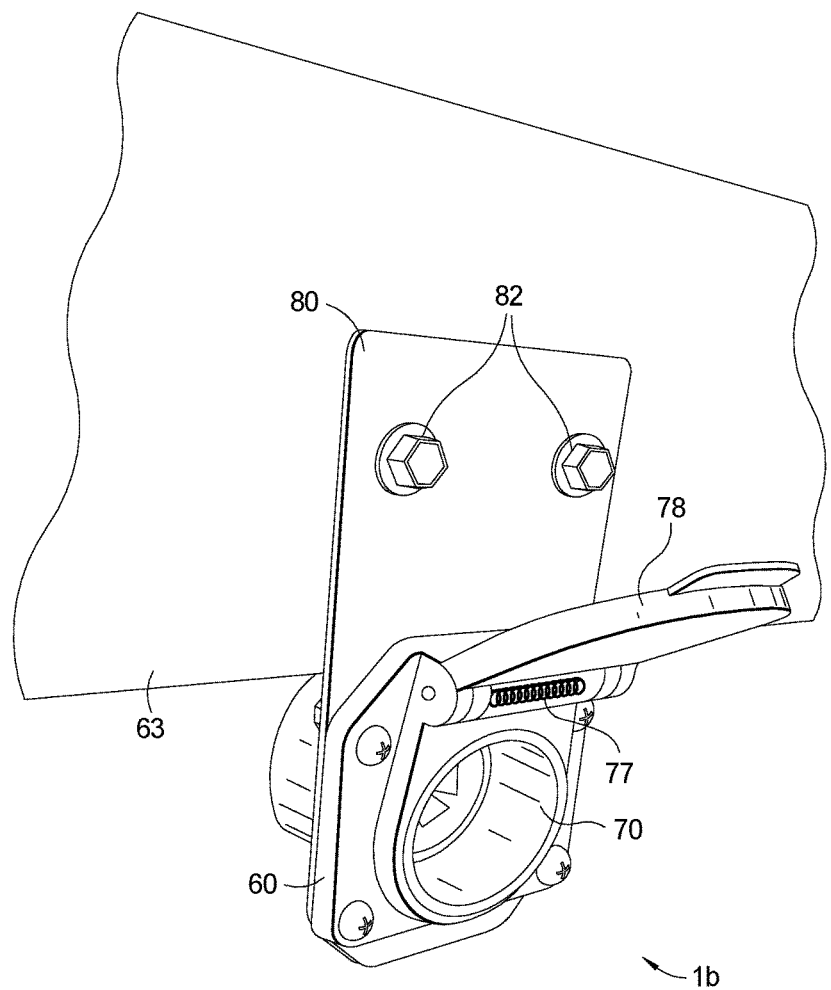
FIG. 10 is a perspective view of the trailer plug protection device shown in FIGS. 6-8 mounted to a frame of a trailer.

As shown in FIGS. 6, 8 and 10, exemplary trailer plug protection device 1b may include a housing 60, a terminal protective port 70 defined by or positioned within housing 60, a spring 77, a cover 78, and a pin 79. Cover 78 may be pivotally connected to housing 60 using pin 79. Spring 77 is positioned between housing 60 and cover 78 and operates to bias cover 78 to a closed position. Terminal protective port 70 may include an opening 72 and one or more male protective protrusions 74 that correspond to metal contacts in the appropriate female ports of a trailer connector/plug (FIG. 9). For example, trailer connectors/plugs vary from 4-way to 7-way connectors, and thus the number of male protrusions 74 may vary depending on the application.

In some exemplary embodiments, protective non-conducting male protrusions 74 may be integrated within opening 72 created by housing 60 of the trailer plug protection device 1b with the dimensions of the plug-like housing 60 around the female parts of the trailer connector/plug. In some other example embodiments, male protective protrusions 74 may be flush with the surface of the trailer connector plug when non-conducting male protrusions 74 are inserted into the trailer connector plug.

Thus, the protective non-conducting male protrusions 74 may be integrated within housing 60, and such housing 60 may be attached to a trailer via screw(s), bolt(s), or another means for attachment. In an exemplary embodiment, as best seen in FIGS. 8 and 10, housing 60 may be mounted into a metal plate 80 via screws 62, and trailer plug protection device 1b can be mounted to a trailer 63 via inserting bolts or screws through holes 82. However, housing 60 including terminal protective port 70 may also be integrated within a trailer at the time of manufacturing.

When the trailer plug is not being used (disconnected from its towing vehicle), the trailer plug can be inserted into terminal protective port 70 in housing 60, which serves as a protective element that protects the plug itself (and its metal contacts) from physical damage as well as exposure to air, humidity, and dust or dirt particles which can result in oxidation and subsequent damage to the pins of the connector.

Figure 7:
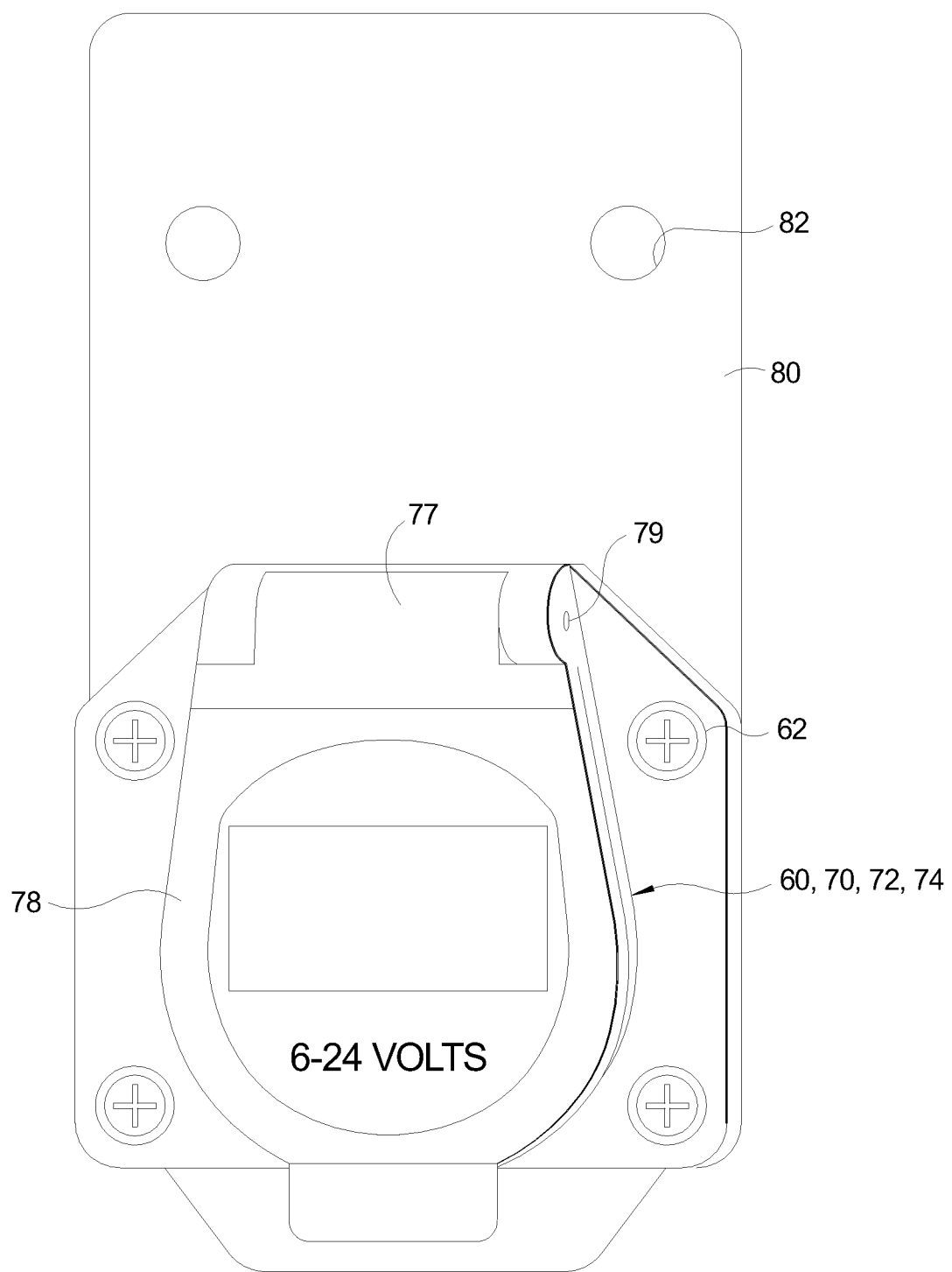
FIG. 7 is a front view of the trailer plug protection device shown in FIG. 6 with the cover in a closed position.

As best seen in FIG. 7, cover 78 may be kept in a closed position when terminal protective port 70 is not being used (e.g., when the trailer is hitched to a tow vehicle and the trailer connector is plugged into the tow vehicle female port and electrically connected via conducting male protrusions of the tow vehicle female port for normal operation). This can help keep the inside of terminal protective port 70 (opening 72 and non-conducting male protrusions 74) free from debris and moisture. Again, housing 60 may be attached to the trailer via screw(s), bolt(s), or another means for attachment. For example, housing 60 may be mounted or attached to the trailer via bolts 62, nuts 64, metal plate 80, holes 82 and corresponding bolts or screws (not shown). Additionally or alternatively, the housing may also be integrated directly within a trailer at the time of manufacturing.

It should be noted the terminal protective port 70 (and the protective male protrusions 74) of trailer plug protecting device 1b does not actually function as a connection for electrical conduction. Rather, with additional reference to FIG. 9, its purpose is simply to receive and secure male end 92 of trailer cable 90 when not in use (in order to protect the female ports 94 (metal contacts) and male end 92 itself when not connected to a tow vehicle for its ordinary purpose). For example, terminal protective port 70 may be very similar to the existing female port of a towing vehicle, except that protective non-conducting male protrusions 74 are not electrically connected to anything (e.g., no wires or circuits are connected to terminal protective port 70, and no power or signals are being communicated). Referring to FIG. 8, the housing 60 of the trailer plug protecting device 1b extends outward through the metal plate 80 just deep enough for the trailer plug male end 92 to be inserted into the receptacle, and the housing 60 has a flat rear surface (without any protrusions or metal contacts/connectors), which may be made of the same material as the rest of the housing (e.g., durable plastic or the like). Although the existing female port of a towing vehicle may have a similar receptacle as housing 60, there is ordinarily an additional recessed portion of the receptacle extending further outward from the rear side of the housing to accommodate electrical conduction connections, as well as a small protrusion with a metal connector extending outward from the rear side of this additional recessed portion, for providing power and sending electrical signals during ordinary use of the towing vehicle and trailer (instead of simply a flat surface like housing 60). However, since the extra receptacle space and the electrical connections of the existing female port of the towing vehicle are not needed for the terminal protective port 70 to fulfill its intended use of protecting the trailer plug from exposure to the elements, a further recessed portion of the housing and a rear side protruding metal connector can be eliminated from the design, which allows the trailer plug protecting device 1b to be manufactured with less materials at lower cost and in a more compact form.

Accordingly, when the male end 92 of trailer cable 90 is inserted into the opening 72 of the terminal protective port 70, and the protective male protrusions 74 of the terminal protective port 70 are thus inserted into female ports 94 (with metal contacts) of trailer cable 90, nothing happens electrically beyond the physical protection thereof. In this regard, terminal protective port 70 may be considered a non-electrically-functioning dummy port and non-conducting protective male protrusions 74 may be dummy contacts or connectors (other than their combined sole function of physically protecting the male trailer plug and its female ports, respectively). Thus, even in exemplary embodiments where terminal protective port 70 has the same metal contacts 74 as the receptacle of the trailer plug to be connected, terminal protective port 70 is a "dead end" receptacle with respect to conduction and/or electrical signals.

FIG. 9 shows a perspective view of a trailer plug that may be used with trailer plug protection device 1b shown and described above with respect to FIGS. 6-8 and 10, according to some exemplary embodiments. As shown in FIG. 9, trailer plug includes a cable 90, a male end 92, and a plurality of female ports 94 including metal contacts. The protective non-conducting male protrusions 74 of terminal protective port 70 of the trailer plug protecting device 1b are designed to securely mate with and protect female ports 94 (and their metal contacts) in male end 92 of the trailer plug.

FIG. 6 illustrates an example 7 way (or 7 pole) connector with flat pins (blades), which is the most popular trailer connection type found on late model SUV's, trucks, and RV's that come equipped with a trailer hitch from the factory. However, inventive concepts described above with reference to FIGS. 6-9 may apply similarly to other common types of trailer connectors (e.g., 4 way, 5 way, 6 way, round, flat, etc.). Details of the electrical functions of each pin or blade (e.g., running lights, turn signals, brakes, power, ground, etc.) are well known, and will not be described herein.

In a non-limiting exemplary embodiment, trailer plug protection device 1b is attached to or incorporated into the trailer. When the trailer plug protection device 1b is not in use (e.g., when the trailer is electrically connected to a tow vehicle), cover 78 of the plug protection device would be closed (FIG. 8). When the trailer is not being used (no longer connected to the tow vehicle), cover 78 of trailer plug protector device 1b would be opened and the plug-like housing of the female components of the connector at the end of electrical cable 90 is inserted into opening 72 of terminal protective port 70 of trailer plug protective device 1b, resulting in the protective non-conducting male protrusions 74 of trailer plug protection device 1b entering the female ports of the trailer connector, providing an improved degree of protection from physical damage, exposure to the elements, and oxidation.

From the foregoing, it will be seen that this invention is one well adapted to attain all the ends and objects hereinabove set forth together with other advantages which are obvious and which are inherent to the method and apparatus. It will be understood that certain features and sub combinations are of utility and may be employed without reference to other features and sub combinations. This is contemplated by and is within the scope of the claims. Since many possible embodiments of the invention may be made without departing from the scope thereof, it is also to be understood that all matters herein set forth or shown in the accompanying drawings are to be interpreted as illustrative and not limiting.

The constructions described above and illustrated in the drawings are presented by way of example only and are not intended to limit the concepts and principles of the present invention. As used herein, the terms "having" and/or "including" and other terms of inclusion are terms indicative of inclusion rather than requirement.

While the invention has been described with reference to preferred embodiments, it will be understood by those skilled in the art that various changes may be made and equivalents may be substituted for elements thereof to adapt to particular situations without departing from the scope of the invention. Therefore, it is intended that the invention not be limited to the particular embodiments disclosed as the best mode contemplated for carrying out this invention, but that the invention will include all embodiments falling within the scope and spirit of the appended claims.

What is claimed is:

1. A plug protecting device for use with a male charging or connecting plug of an electronic device, the plug protecting device comprising:
   a housing; and
   a non-conductive terminal protective port defined in the housing, wherein the non-conductive terminal protective port is configured for securely receiving the male charging or connecting plug of the electronic device, and wherein the non-conductive terminal protective port includes non-electrically functioning metal contacts that correspond to, contact, and to protect the male charging or connecting plug when positioned in the non-conductive terminal protective port.

2. The plug protecting device of claim 1, wherein the non-conductive terminal protective port is formed of a first material, wherein the housing is formed of a second material, and wherein the first material is different than the second material.

3. The plug protecting device of claim 1, wherein the housing includes a first face and a second face, wherein the non-conductive terminal protective port is defined in the first face, wherein an adhesive layer is disposed on the second face to provide for selective adhesion to a mounting surface.

4. The plug protecting device of claim 1, wherein the housing is adapted to be attached to a mounting surface using a fastener, wherein the fastener includes at least one of screws, bolts or washers.

5. The plug protecting device of claim 1, wherein the housing includes a first face and a second face, wherein the non-conductive terminal protective port is defined in the first face, and wherein the second face is mounted to a mounting surface.

6. The plug protecting device of claim 1, wherein the non-conductive terminal protective port is a plurality of non-conductive terminal protective ports.

7. The plug protecting device of claim 6, wherein the plurality of non-conductive terminal protective ports are configured for receiving and securing different types of connectors, respectively.

8. The plug protecting device of claim 1 wherein the non-conductive terminal protective port is a dead end receptacle with respect to electrical connections.

9. A trailer plug protection device for use with a male connecting plug associated with a trailer, the trailer plug protection device comprising:
 a housing; and
 a non-conductive terminal protective port defined by the housing, wherein the non-conductive terminal protective port is configured for securely receiving the male connecting plug associated with the trailer to protect the male connecting plug when not connected to a receiver associated with a vehicle, wherein the male connector plug includes female ports and contacts, wherein the non-conductive terminal protective port includes non-electrically functioning male protrusions that correspond to the female ports and contacts of the trailer plug, and wherein the non-electrically functioning male protrusions protect the female ports and contacts when positioned in the non-conductive terminal protective port.

10. The trailer plug protection device of claim 9, wherein the male protrusions are non-conductive.

11. The trailer plug protection device of claim 9, further comprising a cover that is pivotally coupled to the housing, wherein the cover is selectively disposed over the non-conductive terminal protective port to protect the non-conductive male protrusions.

12. The trailer plug protection device of claim 9 wherein the non-conductive terminal protective port is a dead end receptacle that prevents electrical signals from reaching the male connecting plug.

13. An integrated plug protecting device comprising:
 a plug protector containing a non-conductive terminal protective port defined in a surface,
 wherein the non-conductive terminal protective port is configured for securely receiving a male end of a charging or connecting plug for an electronic device to protect a conductive lead in the male end of the charging or connecting plug, wherein the non-conductive protective port includes non-electrically functioning metal contacts incorporated within a housing.

14. The integrated plug protecting device of claim 13, wherein the non-electrically functioning metal contacts are non-conductive and recessed within the housing to protect corresponding male pins of the charging or connecting plug for the electronic device.

15. The integrated plug protecting device of claim 13, wherein the non-conductive protective port is a dead end receptacle with respect to electrical signals.

16. An integrated trailer to vehicle plug protection device comprising:
 a trailer plug protector containing a non-conductive terminal protective port defined in a surface,
 wherein the non-conductive terminal protective port is configured for securely receiving a male end of a trailer plug to protect a conductive lead in the male end of the trailer plug, wherein the non-conductive terminal protective port includes a plurality of non-electrically functioning male protrusions incorporated within a trailer for protecting corresponding female pins of the trailer plug.

17. The integrated trailer to vehicle plug protection device of claim 16, wherein the male protrusions are non-conductive.

18. A plug protecting device for use with a male charging or connecting plug of an electronic device, the plug protecting device comprising:
 a housing; and
 a non-conductive terminal protective port defined in the housing, wherein the non-conductive terminal protective port is configured for securely receiving the male charging or connecting plug of the electronic device to protect the male charging or connecting plug when not connected to the electronic device, wherein the non-conductive terminal protective port is a plurality of non-conductive terminal protective ports, and wherein the plurality of non-conductive terminal protective ports are configured for receiving and securing different types of connectors, respectively.

* * * * *